(12) United States Patent
Ferreira et al.

(10) Patent No.: US 12,518,182 B2
(45) Date of Patent: Jan. 6, 2026

(54) OPEN SET CLASSIFICATION BASED ON HETEROGENOUS MODEL ENSEMBLE IN MULTISENSOR ENVIRONMENTS

(71) Applicant: EMC IP Holding Company LLC, Hopkinton, MA (US)

(72) Inventors: Paulo Abelha Ferreira, Rio de Janeiro (BR); Vinicius Michel Gottin, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 1088 days.

(21) Appl. No.: 17/450,527

(22) Filed: Oct. 11, 2021

(65) Prior Publication Data

US 2023/0110993 A1    Apr. 13, 2023

(51) Int. Cl.
*G06N 5/04* (2023.01)
*G06F 16/28* (2019.01)
*G06N 20/00* (2019.01)

(52) U.S. Cl.
CPC ............ *G06N 5/04* (2013.01); *G06F 16/285* (2019.01); *G06N 20/00* (2019.01)

(58) Field of Classification Search
CPC .......... G06N 5/04; G06N 20/00; G06N 20/20; G06F 16/285
See application file for complete search history.

(56) References Cited

U.S. PATENT DOCUMENTS

| 11,176,488 | B2 | 11/2021 | Gottin et al. |
| 2018/0107879 | A1* | 4/2018 | Laput ................ G06N 20/00 |
| 2022/0126864 | A1* | 4/2022 | Moustafa ............ G06T 1/0007 |

OTHER PUBLICATIONS

Amancio et al. "A Systematic Comparison of Supervised Classifiers", 2014, pp. 14, pone.0094137 1 . . . 14.*
Aguileta, B. R. O. Mayora, E. Molino-Minero-Re and L. Trejo, "Multi-sensor fusion for activity recognition—a survey," Sensors, vol. 19, No. 17, p. 3808, 2019.
Mohamed, J. Ren, M. El-Gindy, H. Lang and A. Ouda, "Literature survey for autonomous vehicles: sensor fusion, computer vision, system identification and fault tolerance," International Journal of Automation and Control, vol. 12, No. 4, pp. 555-581, 2018.
P. Oza and V. M. P., "C2ae: Class conditioned auto-encoder for open-set recognition," in Proceedings of the IEEE Conference on Computer Vision and Pattern Recognition, 2019.

* cited by examiner

*Primary Examiner* — Li Wu Chang
(74) *Attorney, Agent, or Firm* — Workman Nydegger

(57) ABSTRACT

One example method includes identifying active device data streams, based on the active device data streams identified, selecting applicable ML models, obtaining a respective classification inference from each of the ML models, wherein each of the classification inferences applies to a respective active device data stream, identifying a current agreement between the respective classification inferences generated by the models, comparing the classification inferences associated with the current agreement with historical classification inferences associated with historical agreements, and based on the comparing, determining whether or not one or more of the data streams comprises a piece of data of an unknown class.

20 Claims, 7 Drawing Sheets

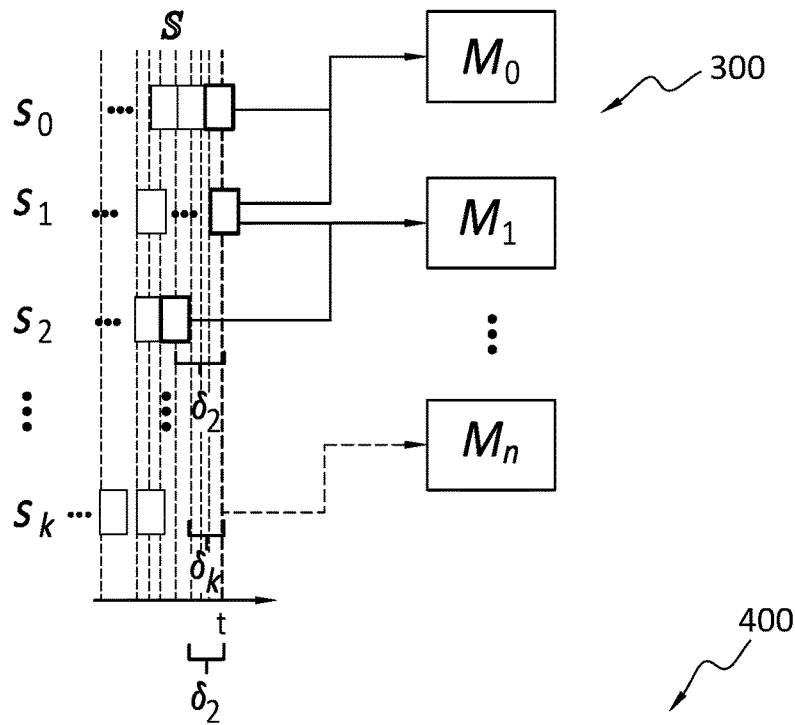

FIG. 3

```
def PairwiseAgreement(sensor_set: List[StreamData],
                      model1: Model,
                      model2: Model):
    agreements_count ← 0
    for idx, streams_data in enumerate(sensor_set):
        input1 ← model1.filter(streams_data)
        input2 ← model2.filter (streams_data)
        model1_inference ← model1.classify(input1)
        model2_inference ← model2.classify(input2)
        if correspondence(model.c, model1_inference,
                          model2.c, model2_inference):
            agreements_count ← agreements_count + 1
    agreement ← agreements_count / length(test_set)
    disagreement ← 1 - agreements_count
    return  agreement - disagreement
```

FIG. 4

CONTEXTUAL MODEL AGREEMENT

OPEN SET CLASSIFICATION BASED ON HETEROGENOUS MODEL ENSEMBLE IN MULTISENSOR ENVIRONMENTS

FIELD OF THE INVENTION

Embodiments of the present invention generally relate to machine learning, such as in edge computing environments. More particularly, at least some embodiments of the invention relate to systems, hardware, software, computer-readable media, and methods for comparing the outputs of various machine learning models, which may be running at various edge nodes, to identify the presence of objects of unknown classes in data received by the edge nodes.

BACKGROUND

Supervised learning methods, which are one type of a machine learning (ML) process, are based on an underlying assumption that a system possesses complete knowledge of the mappings from raw data to classes of data. That is, any and all data received by an ML model, such as from a sensor or other node, can be classified as belonging to a particular class within a domain of possible classes. Put another way, such models typically assume a mutually exclusive, collectively exhaustive (MECE) mapping from the feature domain to the finite set of classes that the model was trained on. While this assumption might be correct for some kinds of tasks, such as predicting the real number of a drawn digit, or classifying an image in a set of finite classes, in real world applications, it is rarely the case that the available annotated/training data for an ML task contains all the possible classes of the domain, that is, all possible classes of data that may be generated and fed to the model, such as from one or more nodes, during real world operations.

However, relaxing an assumption of MECE mapping from feature to classes presents challenges. For example, the ML models not based on the MECE assumption would have to be designed to be capable of distinguishing between the data in each of its known classes, and the data of unknown classification(s). This kind of task is not readily addressed by any of the conventional ML models, such as RandomForests, Support Vector Machines (SVM) or Deep Neural Networks (DNNs). For example, DNNs used for classification commonly apply a softmax activation in the end, which means every single observation of the feature space will be mapped to one of the known data classes.

Particular problems may arise in environments that include various different types of sensors, such as sensors for sensing and reporting on physical attributes of a physical environment, each of which may be generating data to be used as input to one or more ML models. That is, dealing with machine learning tasks in multisensor environments implies additional complexity with respect to the traditional machine learning approaches. For example, different sets of sensors may be actively collecting data at each instant. This is particularly relevant when decision-making tasks require, or are correlated, to certain subsets of sensors.

A typical way to deal with such environments is to perform a process sometimes referred to as sensor fusion. The sensor fusion process may enable a system to obtain combined sensory information in a representational format that can be used as input for multiple models. However, this approach presents its own difficulties. For example, the sensor fusion must be performed in real time, if real time inference is required, which may not be trivial. As another example, all models used in a sensor fusion approach must be designed, structured and trained with respect to the shared data representation. Thus, existing models cannot be used directly and need to be retrained when the data representation is defined and/or updated such as, for example, when a new kind of sensors is deployed to the domain where the sensor fusion process is being performed.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 3 discloses some example input sensor streams active and inactive at time t.

FIG. 4 discloses a model algorithm for determining partwise agreement.

DETAILED DESCRIPTION OF SOME EXAMPLE EMBODIMENTS

Figure 1:
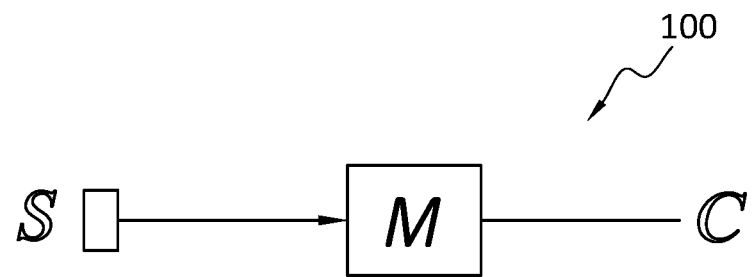
FIG. 1 discloses aspects of a machine learning classification model.

Embodiments of the present invention generally relate to machine learning, such as in edge computing environments. More particularly, at least some embodiments of the invention relate to systems, hardware, software, computer-readable media, and methods for comparing the outputs of various machine learning models, which may be running at various edge nodes, to identify the presence of objects of unknown classes in data received by the edge nodes.

In general, example embodiments of the invention embrace, among other thing, methods for dealing with an open set multi-sensor multi-model environment, that is, an environment that may employ multiple ML models receiving data streams from various nodes, such as sensors, in the environment. The ML models, which may not necessarily be adapted for use with open set domains, may be composed in an ensemble to enable, for objects of unknown classes, the drawing of an inference as to the classes of those objects. The ensemble of individual models may preclude any need for complex sensor fusion approaches. An ensemble graph, such as may be generated by various example embodiments, may enable a comparison of the current agreement between a set of models, to the historical agreement levels between the models in the set. Divergences in the agreements may be used to indicate the presence of objects of unknown classes.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that data may be collected, classified, and used by an ML model even if the data does not fall within any classifications with the domain of the ML model. Embodiments may enable and/or implement open set ML models. Various other advantages of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. OVERVIEW

Example embodiments may be employed in edge environments with numerous nodes running ML (Machine Learning) models for inference at the edge. More particularly, embodiments may be implemented in domains where multimodal sensor inputs are used in different combinations as input to multiple models that aim at the same, or a similar, data classification task. Embodiments may be implemented in various use cases, including (i) use cases with these characteristics: object detection for intelligent vehicles that may include, for example, camera(s), LIDAR, microphone, and/or accelerometer sensors, and (ii) use cases involving object detection in a factory product line, where such detection may be performed, for example, by camera(s), weight sensors and positional RFID sensors. In general, such use cases involve dynamic domains in which the current scenarios in the domain may vary over time, where a particular scenario may be defined in whole or in part by the sensor data streams that are available, and/or ML models that are active, in that domain at a particular time, or during a particular timeframe. These example use cases also demonstrate that the example embodiments may be relevant for both centralized, as well as edge-near edge-core, environments if different ML models reside at different edge nodes.

In more detail, example embodiments may deal with open set classification, in which a machine learning task may be extend to account for objects of unknown classes in a domain of the machine learning task. Some example embodiments may obtain, or determine, an open set classification for data in a domain, given the following parameters and constraints: embodiments may consider most, or all, data input sources available; embodiments may allow for, but not necessarily require, individual models specifically built for open set classification; and, embodiments may not require complex sensor fusion approaches, whether indirect or otherwise.

Thus, example embodiments may embrace methods for obtaining open set classification via a model ensemble that may or may not contain open set models. Embodiments may also provide a method for calculating model agreement in a multi-sensor multi-model environment without requiring ground truth labeled data. Further, embodiments may provide an approach for considering, via a confidence score for example, the identification of objects of unknown classes during inference if open set models are part of the ensemble.

To these, and/or other, ends, example embodiments may employ a heterogeneous model ensemble approach. In such an approach, each model in the ensemble may consume different combinations of input data, originating from distinct sensors, and may or may not be able to indicate the presence of objects of unknown class, that is, each model may or may not individually be an "open set model." An ensemble may be structured as a graph of historical model agreements under different scenarios. At inference time, embodiments may leverage the current inferences from multiple models and then graph to determine a final classification. The resulting classification may indicate an object of unknown class, thus constituting an open set classification. This may be the case even when there are no open-set models are part of the ensemble. Embodiments may determine an object of unknown class based on the historical and current agreements/disagreements of models.

B. FURTHER ASPECTS OF SOME EXAMPLE EMBODIMENTS

B.1. Multiple Models in A Multisensor Environment

Attention is first directed to the case of a traditional machine learning classification model. Note that machine learning classification models, of any type, may be referred to herein simply as a 'model' or as 'models.' Let M be a machine learning model that receives, as input, data from a sensor stream s and classifies the input into one of a set of classes C, as shown in the traditional machine learning classification model 100 disclosed in FIG. 1.

Further attention is directed to an environment in which multiple sensor streams are available, and in which multiple models are deployed. These models may partially share sensor streams $s \in \mathbb{S}$ as inputs and classify their input into, possibly overlapping, sets of classes. An example of such an environment 200 is disclosed in FIG. 2. More particularly, FIG. 2 discloses a multisensor environment 200 in which multiple models M0 . . . Mn are available for classification of objects over classes $\mathbb{C}$.

Figure 2:
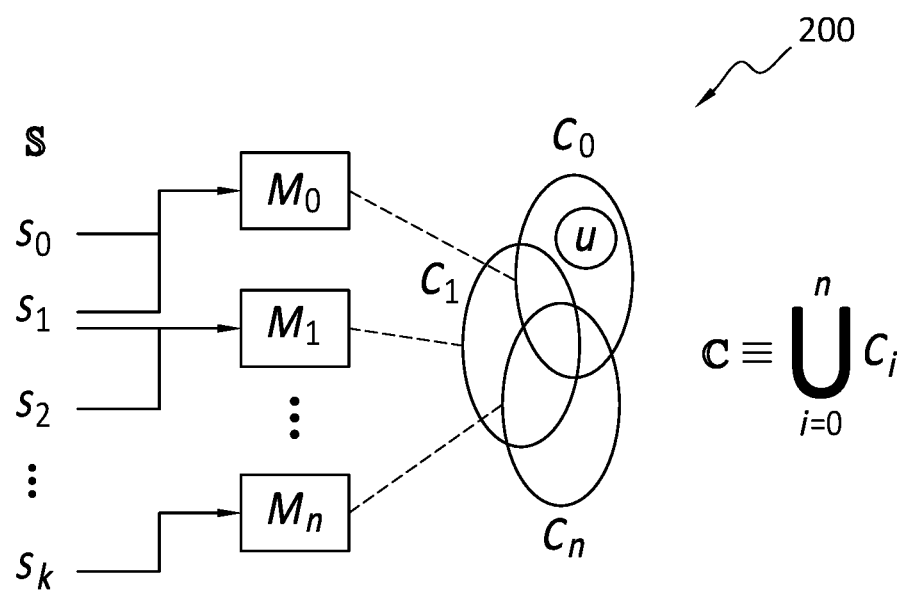
FIG. 2 discloses aspects of a multisensor environment in which multiple models $M_0 \ldots M_n$ are available for classification of objects over classes $\mathbb{C}$.

In more detail, and with continued attention to the example of FIG. 2, there is discloses a set $\mathbb{S}$ of sensors that may populate input streams to a model over time. These input streams may be selectively used by models M0, M1, . . . Mn to classify the inputs. Model Mi may then classify the input into one or more classes $c \in Ci \subset \mathbb{C}$. One or more of the models M0, M1, . . . $M_n$ may be an open set model, examples of which are disclosed elsewhere herein. Such models may classify the input that they receive as belonging to an unknown class. For some purposes, a special class u may be considered to represent such classifications by all models. In the example of FIG. 2 only model M0 is an open set model, with a class $u \in C_0$. The "unknown" class of one model is not necessarily considered equal to the "unknown" class of another model.

It is also disclosed in FIG. 2 how a particular input stream may be used as input by multiple models. Consider, for example, sensor stream S1 in FIG. 2—that sensor stream S1 is used as input by both models $M_0$ and $M_1$. In this formulation, a sensor stream may directly correspond to the data obtained from a sensor. Alternatively, a sensor stream may comprise the result of a transformation applied to data received from one or more sensors. For example, sensor stream S1 may comprise a pointwise positional data of an entity, originating directly from a GPS senso. Sensor stream $S_2$ may comprise a computed instant acceleration for that same entity, derived from an inertial measurement unit sensor as well as the relative positional data from a GPS sensor.

With attention now to FIG. 3, it is noted that sensor streams may not necessarily be synchronized, and not all sensor streams may be active at all times. At a certain time t only a subset of the sensor streams may provide relevant data. This is shown in the configuration 300 of FIG. 3, which discloses groups of input sensor streams S that are active, and inactive, at time t.

Particularly, in FIG. 3, sensors s0, s1 and s2 provide data at instant t, while sensor $S_k$ does not. It may be assumed, in this example, that a maximum delay $\delta_j$ is determined for each sensor stream sj, $0 \le j \le k$, such that data collected at, and before, $t-\delta k$ is considered 'stale' and cannot be used. Sensor stream $S_2$ may be considered as active, since $\delta_2$ is greater than the elapsed time since the last data sample. On the other hand, sensor stream $S_k$ is inactive at time t, since more than $\delta k$ time has elapsed since the last data sample has been obtained from that sensor stream.

It may be assumed, in some cases at least, that the values of $\delta k$ can be known at all times—if they comprise a dynamic value, it may be assumed that they can be determined by domain contextual information. For example, in the case of sensor streams that represent transformed or aggregated sensor data, the maximum delay $\delta$ will typically be larger than the time for the computation of that transformation or aggregation. Note that because sensor streams may not be active all the time, not all models can be applied at all instants. In the example of FIG. 3, models $M_0$ and $M_1$ can be applied, since their input sensor streams are active. Model Mn, on the other hand, cannot.

B.2. Building a Model Agreement Graph

As noted earlier herein, an important aspect of some multisensor domains is that each of the available models may generate appropriate classifications for a certain subset of the available sensor streams. All of these models may be considered in a network in which models are represented as nodes and the pairwise relationships between models are referred to as edges. Various methods may be employed for finding the levels of redundancy and complementarity between all pairs of models in an ensemble, and encoding such information on a network of models, enabling the navigation and indexing through the resulting topology. Such methods may comprise an algorithm that includes a function that calculates the pairwise agreement for a pair of models. In general, one example algorithm which may be employed in connection with some example embodiments is configured such that it does not need to consider the ground truths of the samples. The ground truths are not required by this algorithm because example embodiments may hold the instances of agreements between models, not the agreements conditioned to the models being correct. One example of an algorithm according to some example embodiments is denoted at 400 in FIG. 4.

As shown in FIG. 4, the algorithm 400 may comprise obtaining a global sensor_set set of observations from sensor streams, feeding that set to the models, and counting the number of correct predictions that a particular pair of models achieves. Then, an agreement score may be computed that ranges between −1 and 1. A score of 0 means that the models agree and disagree, that is, with each other, an exactly equal number of times, positive values mean that the models agree more frequently than they disagree, and for negative values the converse is true. That is, for negative values, the models disagree more frequently than they agree.

Notice that the algorithm does not condition the agreements to any particular class including the special class u, if any or both of the models are open set models, nor does the algorithm compute the agreements of models based on their correctness. Rather, the algorithm merely keeps count of the relative number of times that two models agree with each other on a particular classification. That is, some example embodiments of the algorithm are based on agreement, or a lack thereof, and are not based on correctness. There may be various reasons for taking this approach.

For example, the accuracy of the models is not affected by the approach implemented by algorithms such as the algorithm 400. Rather, the agreements may be used simply to determine whether an object of unknown class is more or less likely to be one of the classifications given by the models. As another example, simply counting the agreements regardless of the inferences may avoid the need to deal with conditional probabilities distributions. While it may be possible that such an approach could effectively be used, and possibly provide a higher level of certainty in the identification of objects of unknown classes, it would add significant complexity to the decision-making steps. As a final example, because the example algorithm disregards the ground truth, there is no requirement for labeled samples. As such, the model agreements graph may be built (see below) while the inferences are being performed. In conventional approaches, byway of contrast, any labeling is obtained well after the fact, and any approach requiring ground truth would require historical data. The approach employed in example embodiments may be applied to historical data but may also be built 'on-line,' as discussed in more detail below.

It is noted further that, with respect to the example of FIG. 4, the test_set may be assumed to comprise stream data that enables both models. Since those streams may not be the same, the inputs for each model may be obtained by selecting the appropriate streams within the set of streams. The support of an agreement score between two models is the absolute number of times those two models were used concurrently, that is, the length of the test_set, in the algorithm 400.

In the formulation according to some example embodiments, and with continued reference to FIG. 4, the correspondence (C1, C2, c1, c2) defines whether classes c1∈C1 and c2∈C2 are 'equivalent' for the purposes of the classification task in the domain. This means that a type-of relationship between two classes, for example, $C_1$ 'vehicle' and $C_2$ 'car', can determine these two classes to be corresponding to each other for the task of lane-changing in autonomous vehicles. The same relationship may not be equivalent in another domain, such as a toll weighing station for example, where a 'vehicle' may be heavier than a 'car.' The same may be true for other kinds of relationships such as, for example, a part-of relationship ('person', 'face'), or synonym relationship ('motorbike', 'motorcycle').

With the foregoing in view, the following constraints may be held to be true, regardless of domain:
1. ((c1∈C1)∧(c1∈C2))∧correspondence(C1, C2, c1, c2)→c1=c2;
2. c1=u→¬correspondence(C1_, c1, _); and
3. c2=u→¬correspondence(_, C2, _, c2), where _ denotes an unbounded variable. These constraints mean that:

1: if both models can classify an input to an exact same class, that class cannot be equivalent to any other class for those two models—note that as a consequence of this, if C1 is a subset of C2 or vice-versa the only possible resulting equivalence happens with an exact match from both models' inference; and 2 and 3: embodiments do not consider an unknown class by any model as equivalent to any other class—a consequence of this is that a class u in a model is not equivalent to a class u in another—this stands for the strong weight that embodiments may give to the identification of an unknown class for decision making.

Figure 5:
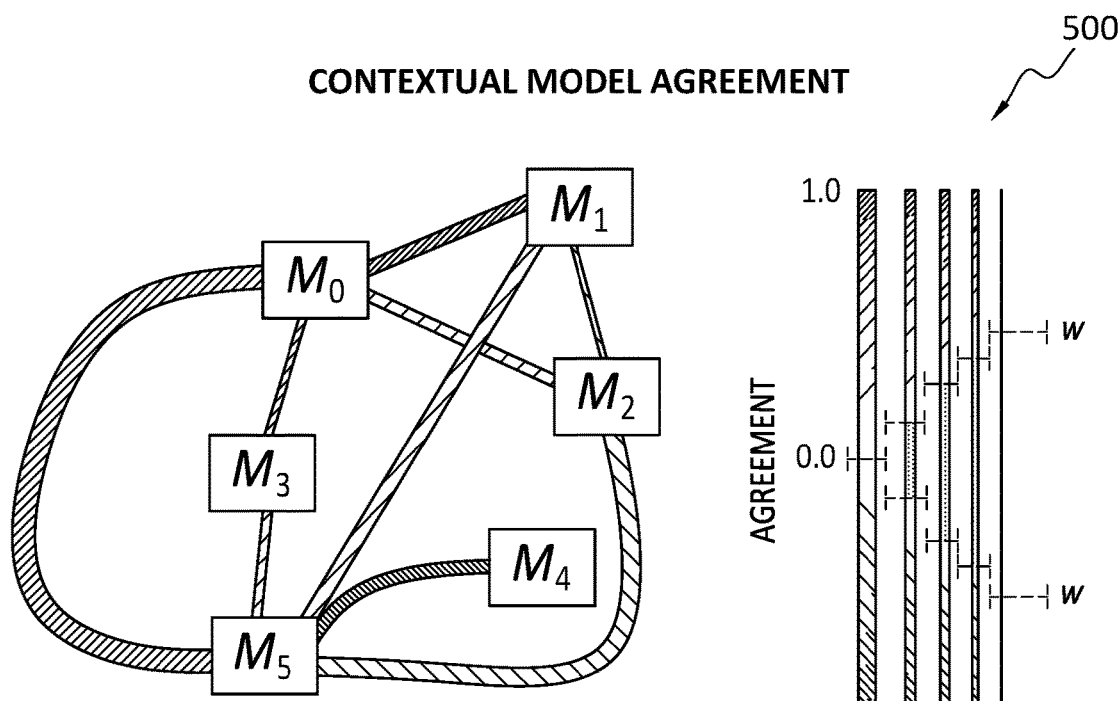
FIG. 5 discloses an example Model Agreement Network (MAN) configuring the relative agreements between models in a domain (edges with |Agreement|<w for a certain support range are pruned and not represented).

FIG. 5 shows a resulting Model Agreement Network (MAN) 500 where all edges with agreement below the network average have been pruned out. That is, FIG. 5 discloses a configuration showing the relative agreements between models in a domain. Edges with |Agreement|<w for a certain support range are pruned and not represented.

Because example embodiments may restrict the graph to, at most, one edge between each two nodes, the maximum amount of edges, that is, the maximum number of calls to the algorithm 500 (denoted as PairwiseAgreement in FIG. 5) that are necessary to build the structure, may be n(n−1)/2, that is, the number of relevant edges in a fully connected symmetric graph. The actual number of edges in the graph may be smaller—there may be pairs of models that are never active at the same time. While unlikely, these may comprise, for example, two models that work on disjoint sets of sensor streams that are alternatives to each other.

In practice, some embodiments may aim to obtain smaller, more tractable graphs, and such embodiments may also intuitively can disregard models whose relative agreement is not representative enough. Thus, embodiments may assume that a function W(s) is available to determine, for each support count s, a threshold w of the minimum absolute value of the agreement for the edge to be kept. All edges for which |Agreement|<w are pruned. The example of FIG. 5 represents how W determines increasing values for w as the support decreases, such as by predetermined ranges of support values. The values w and −w for the minimum support range are highlighted, but it is noted that some embodiments only use the positive value in the computation, that is, the positive value is compared to the absolute value of the relative agreement. Note further, that in FIG. 5, the values for the support are examples only. Typical applications of machine learning models in sensor stream classification domains may comprise much higher values. Also, the number of available models may be much larger. The example of FIG. 5 is limited to five models for clarity of exposition. Finally, it is noted that due to the characteristics of the process describe above, the MAN 500 may be continually updated as the sensor streams produce output, and the models are used to infer classifications for the data contained in the sensor streams and received by the models.

B.3. Ensemble Open Set Classification

Figure 6:
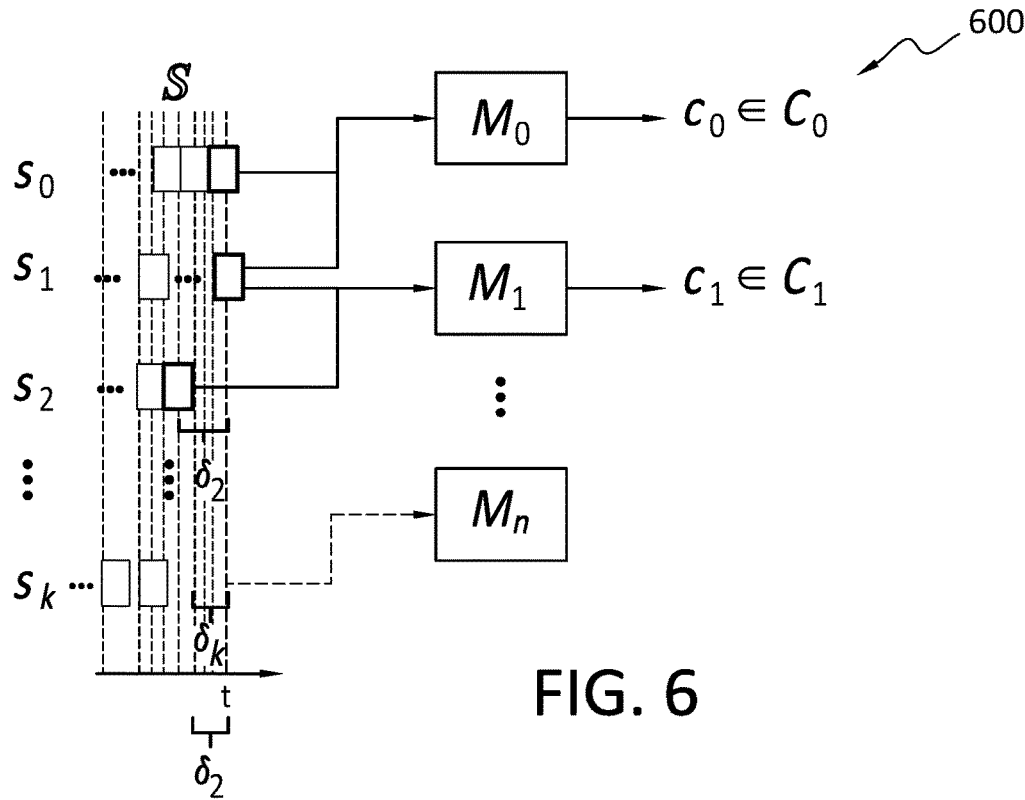
FIG. 6 discloses that at inference time, the active models each yield a classification.

Turning next to FIG. 6, details are now provided concerning how embodiments may perform open set classification based on comparison between historic agreement, annotated in the MAN structure, such as the MAN structure 500 for example, and actual classifications of models in the ensemble. Some example embodiments perform open set classification in a domain, in real time, using operations comprising the following: (1) determine the active sensor streams at instant t; (2) select the models in the ensemble that are applicable; and (3) obtain a classification inference from each such model. This approach is represented in the configuration 600 disclosed in FIG. 6. Particularly, the configuration 600 indicates that, at inference time, each of the models may produce a respective classification c for the data stream(s) received by that model at a particular time, or time period.

After this open set classification process has been performed, any decision process for an ensemble of models may be applied for yielding a unique classification. An example of a straightforward approach would comprise yielding a classification by a majority voting, that is, whichever classification was assigned most often by the models would be the classification assigned. For example, if a classification C1 was assigned by 3 models, C2 assigned by 5 models, and C3 assigned by 1 model, the classification to be assigned would be C2. Alternatively, a weighted voting algorithm may be applied if weights for each classification can be determined. In this approach, the respective classifications assigned by the models may be weighted and then a weighted average for all models calculated, and the resulting classification would the classification whose weight was closest to the average. Example embodiments may refer to the output of any such decision process, that is, a classification assignment process, for a set of models $\mathbb{M}$, referred to as ensemble ($\mathbb{M}$). Using the various models, and the respective classifications that the models have assigned, embodiments of the invention may perform the following operations, either alone, or as a continuation of the operations (1)-(3) noted above in the discussion of FIG. 6: (4) obtain the current agreement between the classifications applied by the models; (5) compare the current classifications of the applied models to the historical agreements between those models in the MAN; and (6) evaluate whether the difference, that is, models that historically agree/disagree now disagree/agree, or vice-versa, is significant. If so, an embodiment may determine that the current observation refers to an object, such as a data object in a stream of data received by a model from a device such as a sensor, of an unknown class.

B.3.1. Current Agreement

In part (4) above, the computation of the current agreement between m active models may be straightforward. To illustrate, for each pair of models Mi, Mj among the $\mathbb{M}$ active models, an embodiment may determine a Boolean current agreement value based on the comparison of the respective classifications generated by the models of the pair. This may be performed using a correspondence function such as the example discussed above in connection with FIG. 4. Embodiments may represent the current agreements between models as a fully connected graph G of current agreements, similar to the MAN, such as the example MAN 500, but in which the support of all edges is 1, and the agreement scores are either 1 or 0.

Figure 7:
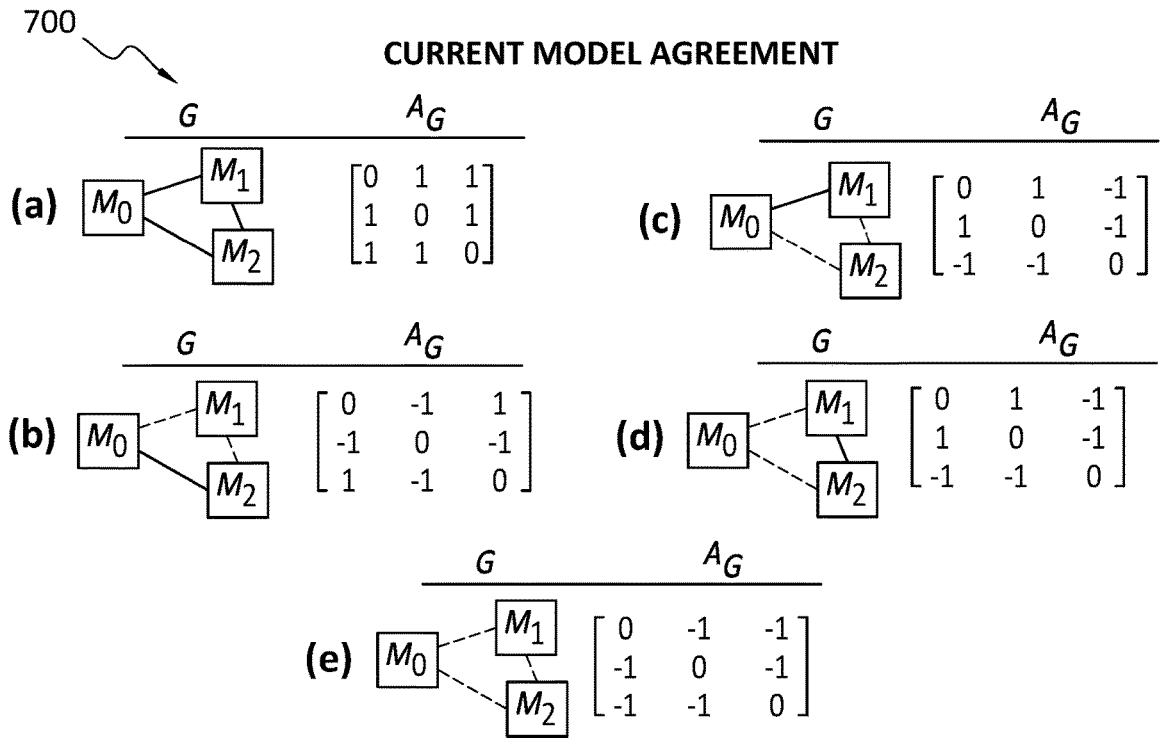
FIG. 7 discloses a possible model agreement graph G configurations and the corresponding matrix representations $A_G$ for m=3.

To illustrate, in an example with $|\mathbb{M}|=3$ models M0, M1 and M2, all possible configurations of G are represented as a current model agreement 700 in FIG. 7. That is, FIG. 7 discloses a possible model agreement graph G configurations, and the corresponding matrix representations AG, for m=3. In the example of FIG. 7, part (a) shows a circumstance in which all the models agree with each other—this is indicated by the solid lines connecting the models. By way of contrast, part (e) shows a circumstance in which none of the models agree with each other—this is indicated by the broken lines connecting the models. In (b), (c), and (d), there are varying levels of agreement and disagreement amongst the models. As in previous examples, only a relatively small set of models has been selected, for ease of explanation. FIG. 7 also discloses how the current model agreement 700 can be represented in symmetric matrix form AG, in which element AGij=AGji represents the agreement of models Mi, MJ. Missing edges are represented as zero, including self-edges, corresponding to the diagonal AGii.

B.3.2. Current and Historical Agreements

Figure 8:
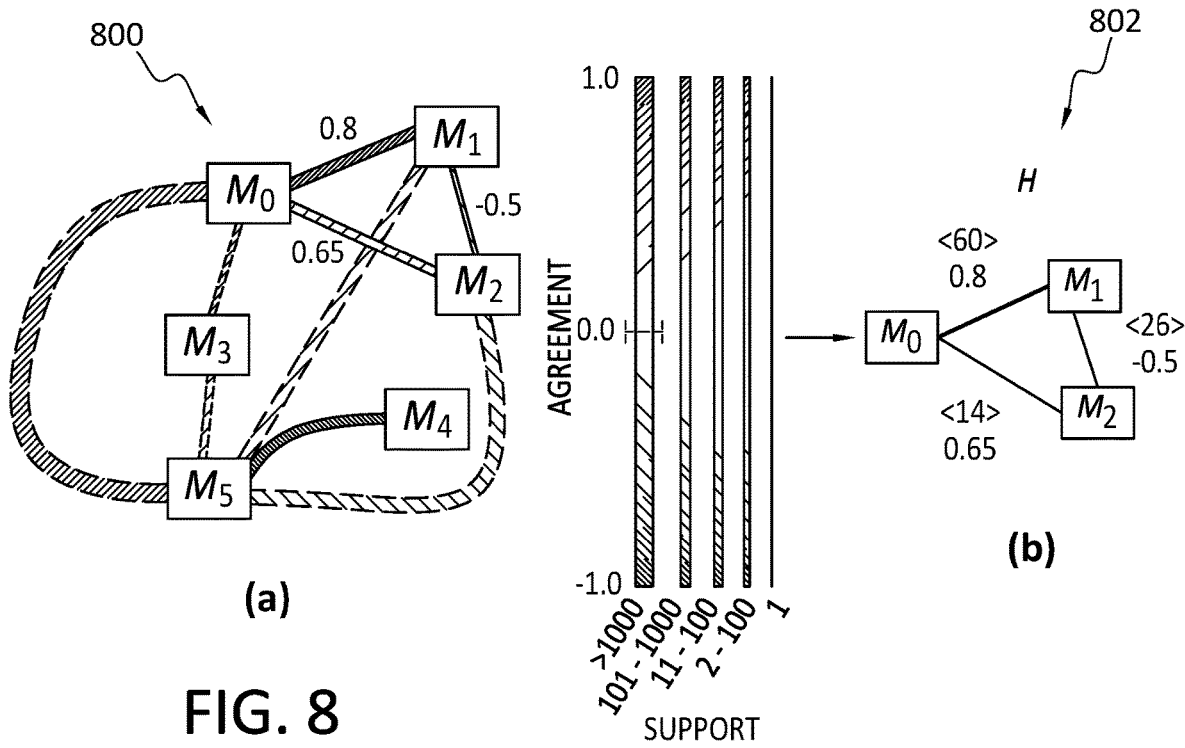
FIG. 8 discloses a process for obtaining a sub-graph H from the MAN by a filtering process.

For executing part (5) (see above), an embodiment may first select from a MAN 800 a subgraph H, denoted at 802 in FIG. 8. Particularly, FIG. 8 discloses obtaining the subgraph H 802 from the MAN 800 using a filtering process. This subgraph H 802 represents the historical agreements among the active models $\mathbb{M}$, and may also be represented in a similar matrix form as the current agreement AH, in similar fashion. The process for obtaining subgraph H 802 may be relatively straightforward. Particularly, example embodiments may remove from the MAN 800 the nodes corresponding to models not in $\mathbb{M}$, and may also remove all edges connected to such nodes. These edges are represented in FIG. 8 by dashed lines. Note also that the relative strength of the agreement, or extent of the lack of agreement, between models is indicated by a relative thickness of the line connecting the models. Thus, relatively strong agreement/disagreement between models is indicated by a relatively thick line connecting the models, while relatively weak agreement/disagreement between models is indicated by a relatively thin line connecting the models.

For compactness of representation, embodiments may also add to the edges of subgraph H 802 the information of the support of each agreement. This information is indicated in FIG. 8 as <60>, <26>, and <14>. That is, the numbers < > constitute counts of the number of times that agreement between models holds. Thus, those numbers reflect explicitly the same information as the width of the edges connecting those nodes, as per the agreement-support bar graph, and as noted above. To illustrate, nodes $M_0$ and $M_1$ have a 0.8 agreement obtained from 60 instances of agreement between those models. The width of the edge in (a) reflects this, and in (b), the number of times of agreement is shown explicitly as < >.

Figure 9:
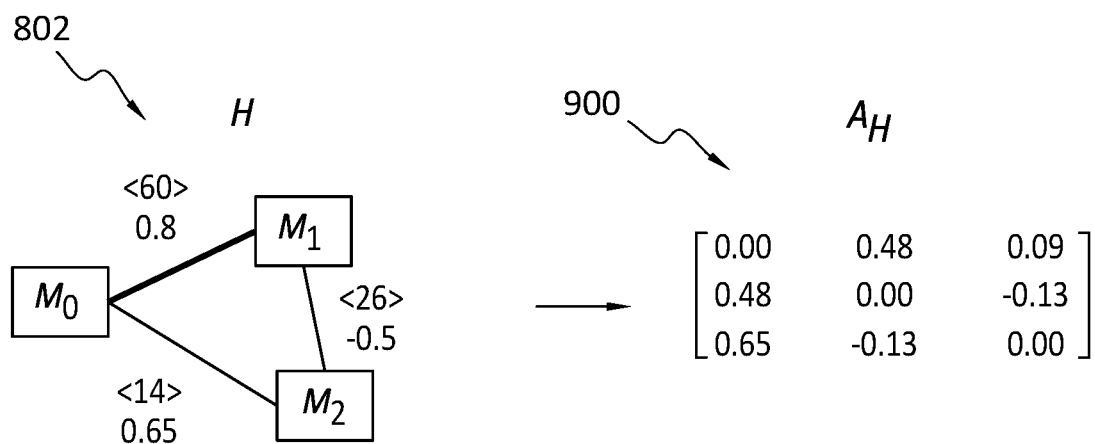
FIG. 9 discloses a representation of the weighing of the agreements in the sub-graph H by the relative support associated to each edge resulting in the matrix $A_H$.

From subgraph H 802, embodiments may obtain matrix AH by scaling the agreements with respect to their relative support in subgraph H 802. The relative support Si,j between two models Mi, Mj in subgraph H 802 may be computed as:

$$S_{i,j} = \frac{supp(M_i, M_j)}{\sum_{(M_a, M_b \in \mathbb{M}^2)} supp(M_a, M_b)}$$

assuming supp(Ma, Ma)=0. Then, each element of AH may be obtained by:

$$A_{H_{i,j}} = agg(M_i, M_j) \times S_{i,j}$$

assuming agg(Mi, Mj) as the agreement associated to the edge Mi, Mj in subgraph H 802. A resulting representation of $A_H$ following the example above is shown in FIG. 9, which discloses a representation of the weighing of the agreements in H by the relative support associated to each edge resulting in the matrix $A_H$ 900.

B.3.3. Evaluating Agreement Divergence

With $A_G$ and $A_H$, embodiments may obtain an aggregate agreement score ags for the current classifications yielded by the $\mathbb{M}$ models as follows:

$$ags = \frac{sum(A_H \times A_G)}{(|\mathbb{M}|-1)^2}$$

The resulting value of the multiplication may be divided by the maximum agreement difference $(|\mathbb{M}|-1)2$ (for $|\mathbb{M}| \geq 2$) to obtain ags as a real number in the range (−1, 1). A strongly negative ags indicates a large deviation from the historical agreements between the models in G. A value of −1 is only obtained when the models in H are in perfect agreement and the current classifications in G are their exact opposite. Conversely, an ags value of 1 represents that models had perfect agreement in H and every agreement was confirmed in the current classifications in G. Note that the formalization need not be necessarily done in terms of matrices since, for instance, they are symmetric, and only the upper triangle may be considered as relevant data in them. It is noted further that, by virtue of being composed of many agreements in the history of the ensemble, the subgraph H 802 may contain combinations of agreements that are unachievable by G. In the example of FIG. 8, it is impossible for G to contain models $M_0$ in agreement with both $M_1$ and $M_2$ while also having $M_1$ and $M_2$ disagree. Another way to consider this is in terms of the transitive property, that is, if $M_0$ agrees with $M_1$ and M2, M1 and M2 must also agree with each other.

The last part of the decision process in some embodiments is to compare the ags value to a domain-dependent threshold value k. If the value of ags is smaller than that threshold, embodiments may determine that the current classification class for models $\mathbb{M}$ is indicative of an object of unknown class:

$$class(\mathbb{M}) = \begin{cases} u, & \text{if } ags < k \\ ensemble(\mathbb{M}) & \text{otherwise} \end{cases}$$

Typically, the value of k may comprise a negative value—and only strong deviations from the historical agreements should indicate objects of unknown class. If the value of ags is greater than k, for example, any positive value, the resulting classification should be the same yielded by the ensemble models $\mathbb{M}$ in the absence of the use of the method according to disclosed embodiments.

Figure 10:
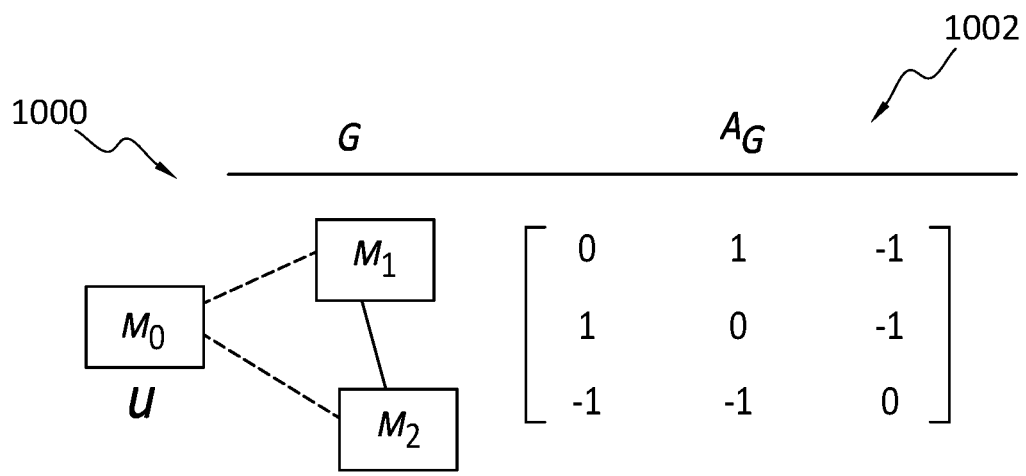
FIG. 10 discloses an example of graph G in which open set model $M_0$ yields unknown class u as its classification output, and in which the matrix $A_G$ is unchanged.

B.3.4. Threshold Adjustment Based on Unknown Classes Identified by Models in the Ensemble Recall that example embodiments may consider open set models in the composition of the agreement network. In order to highlight the effect of unknown classes in the historical data, embodiments may consider that a model yielding u never counts as an agreement, regardless of the classification yielded by the other model. In the following discussion, consideration is given to how embodiments may optionally additionally consider open set classification models during the evaluation of current agreements. Recall as well how the model agreement graph G is obtained from the current inferences of the models in $\mathbb{M}$. Embodiments may additionally obtain an indication, for each model, if that model classifies its current input as u. This is shown in FIG. 10. In general, FIG. 10 discloses an example of a graph G 1000 in which open set model $M_0$ yields unknown class u as its classification output. The matrix $A_G$ 1002 is unchanged. As in the composition of the MAN, a classification of u comprises disagreements with all other models regardless of their output classes.

With the foregoing in view, approaches implemented by example embodiments may further comprise considering the presence of unknown object classifications in the current inferences, that is, model outputs of class u. Some embodiments may perform the steps described in the previous section without modification, hence, why matrix $A_G$ 1002 in FIG. 10 is not changed. Instead, embodiments may optionally modify the threshold k based on the number of unknown object classifications yielded by the models in the ensemble.

Various possible adjustments are possible. Here is presented an option that assumes, as in a typical approach, that k is a negative factor between 0 and −1. We compute an updated threshold:

$$k' = k \times q$$

where factor q is as follows:

$$q = 1 - \left( \frac{|\{M_i \mid M_i \in \mathbb{M}, c_i = u\}|}{|\{M_j \mid M_j \in \mathbb{M}, u \in C_j\}|} \right)$$

The threshold k' is therefore proportional to the number of open set models in the ensemble that output. Notice that $0 \leq k' \leq k$, per the assumption of a negative original threshold k. This means that if open set models in the ensemble output classes $c \neq u$ the threshold $k' \approx k$. On the other hand, if a significant proportion of the open set models in the ensemble indicate objects of unknown classes, k' should be closer to zero and therefore be more likely to indicate that the current samples also indicate object(s) of unknown class.

C. FURTHER DISCUSSION

As will be apparent from this disclosure, example embodiments may comprise various useful features. In general, example embodiments are directed to a method for obtaining open set classification in environments, such as multi-sensor multi-model environments, in which respective data streams are generated by various systems and devices, and used as input to one or more ML models.

One such feature concerns open set classification using model agreement divergence. Particularly, example embodiments include methods for dealing with an open set multi-sensor multi-model environment. The models, that are not necessarily adapted to operating in or with open set domains, may be composed in an ensemble to allow for the inference of objects of unknown classes. The ensemble of individual models may preclude the need for complex sensor fusion approaches. Further, an ensemble graph may provide the ability to compare the current agreement between a set of models to their historical agreement levels. Divergences in the agreements may be used to indicate the presence of objects of unknown classes.

Another such feature concerns the use of models that are not necessarily open set compatible. That is, example embodiments do not require any of the models to be necessarily open set. The ensemble approach disclosed herein is capable of determining likely objects of unknown class based on classifications of traditional closed models working in conjunction with each other. Moreover, if open set models are available, they can be integrated into the ensemble. This approach may allow for open set models in the ensemble in conjunction with traditional models, and may additionally provide a way for factoring in the identification of objects of unknown classes during inference.

A further feature of some example embodiments concerns the building of a network of historical model agreements over time and updating the network over time. Particularly, example embodiments may build a network of model agreements, which may be depicted in graphical form indicating changes that have occurred over time, throughout a lifetime of inferences performed for each model and the input sensor streams to that model. The graph can be built in an online or offline fashion, since example embodiments of the method may require no "ground truth" or labeled data. Furthermore, because no ground truth is required, it may be straightforward to update the model agreements graph continuously, as the inferences are being performed.

A final example of a feature that may be included in one or more embodiments relates to compatibility of such embodiments with traditional ensemble approaches. Particularly, example embodiments may be employed with a host of ensemble methods, such as majority voting or weighted approaches, without imposing any constraints. Example embodiments may provide a decision process to determine whether the resulting classifications indicate an object of unknown class, or whether the results of another traditional ensemble decision process should be applied directly.

D. EXAMPLE METHODS

Figure 11:
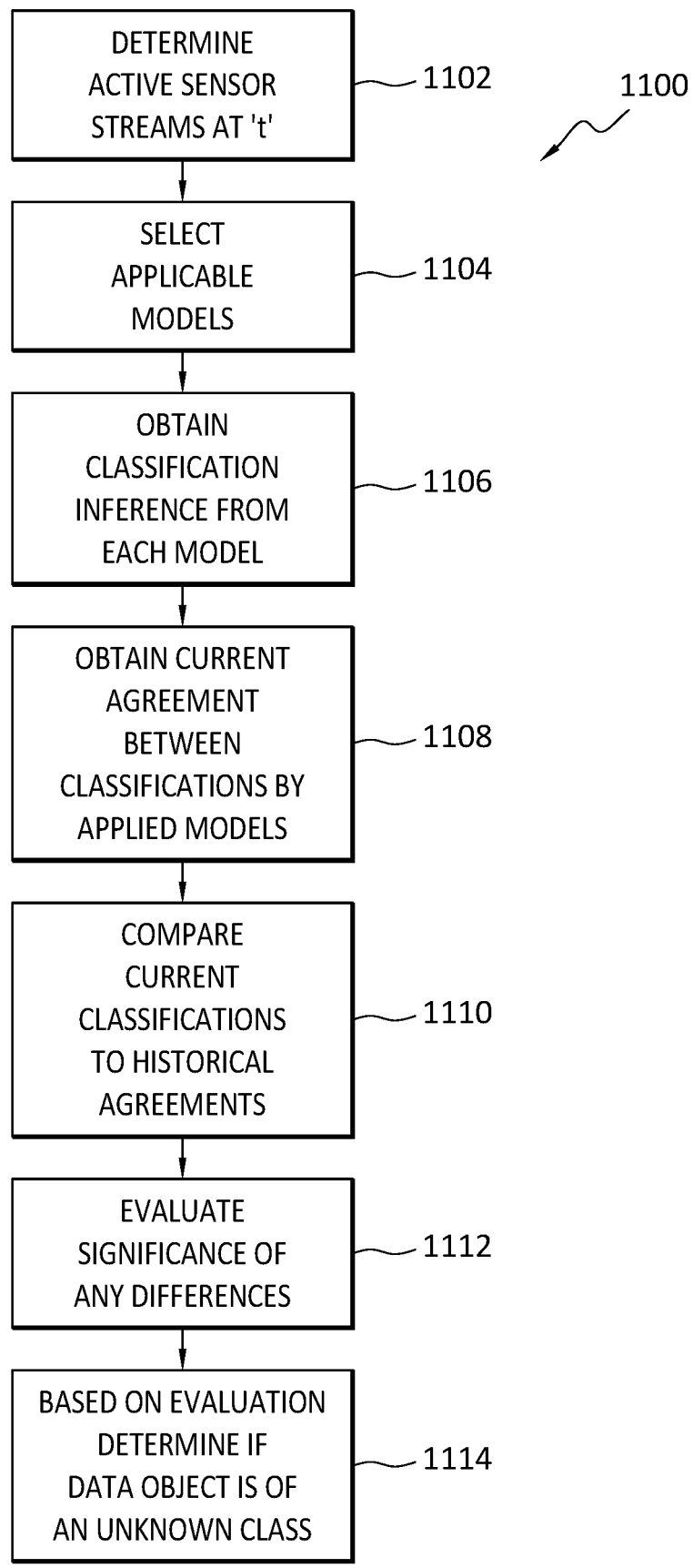
FIG. 11 discloses aspects of an example method according to some embodiments.

It is noted with respect to the example method of FIG. 11 that any of the disclosed processes, operations, methods, and/or any portion of any of these, may be performed in response to, as a result of, and/or based upon, the performance of any preceding process(es), methods, and/or operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Directing attention now to FIG. 11, an example method is denoted generally at 1100. In some example embodiments, one, some, or all, of the operations of the method 1100 may be performed in real time, although that is not necessarily required. Part or all of the method 1100 may be performed at a server, or servers, or other computing entity. Each model involved may be running in an edge environment, such as at a respective sensor or other device that generates a stream of data to be used as an input to a model. In some embodiments, data streams from multiple systems or devices may be transmitted by those systems or devices to a central location, such as a server for example, at which one or more models may be running. No particular architecture or operating environment is necessarily required for any embodiment.

The example method 1100 may begin at 1102 where a determination may be made as to which device data streams are active at a specified time 't.' Based on the determination 1102 as to which data streams are active, the applicable models may then be selected 1104. That is, the applicable models may be those models which are receiving, at time 't,' one or more data streams from the devices.

Next, a classification inference may be obtained 1106 from each of the applicable models. For example, the classification inference may represent, or constitute, a judgment or classification by a model that particular data, or a particular data stream, received by the model does, or does not, belong to a known classification within a particular domain.

After the classification inferences have been obtained 1106, any current agreements between classifications by the applicable models, that is, the classifications obtained at 1106, may then be obtained 1108. For example, a determination may be made as to which models, if any, agree as to the classifications that have been assigned to a data stream by one or more of the models. The current classifications of the data may then be compared 1110 to historical agreements between the models, which may be in a MAN for example.

To the extent that any differences are identified during the comparison 1110, the significance, if any, of such differences may then be evaluated 1112. Based on the evaluation 1112, a determination may be made 1114 as to whether or not a particular data object or other piece of data, or a data stream, is of an unknown class. If a difference is determined 1112 to be significant, it may be concluded that the data is of an unknown class. On the other hand, if the difference is not determined 1112 to be significant, the data may be assigned a classification within the domain of the classifications known to the models.

E. FURTHER EXAMPLE EMBODIMENTS

Following are some further example embodiments of the invention. These are presented only by way of example and are not intended to limit the scope of the invention in any way.

Embodiment 1. A method, comprising: identifying active device data streams; based on the active device data streams identified, selecting applicable ML models; obtaining a respective classification inference from each of the ML models, wherein each of the classification inferences applies to a respective active device data stream; identifying a current agreement between the respective classification inferences generated by the models; comparing the classification inferences associated with the current agreement with historical classification inferences associated with historical agreements; and based on the comparing, determining whether or not one or more of the data streams comprises a piece of data of an unknown class.

Embodiment 2. The method as recited in embodiment 1, wherein the method is performed in real time as the active device data streams are received by the ML models.

Embodiment 3. The method as recited in any of embodiments 1-2, wherein a respective sensor generates each of the active device data streams.

Embodiment 4. The method as recited in any of embodiments 1-3, wherein determining the current model agreement is performed, for each pair of applicable models, using Boolean current agreement values for the classification inferences assigned by the models.

Embodiment 5. The method as recited in any of embodiments 1-4, further comprising building a network of model agreements, and updating the network of model agreements based on generation of classification inferences.

Embodiment 6. The method as recited in embodiment 5, wherein the building of the network of model agreements is performed, prior to the comparing, as a preprocessing step, from an available database of historical classification inferences.

Embodiment 7. The method as recited in embodiment 5, wherein comparing the classification inferences comprises selecting, from a model agreement network, a subgraph that represents historical agreements among the applicable ML models.

Embodiment 8. The method as recited in any of embodiments 1-7, wherein determining whether or not one or more of the data streams comprises a piece of data of an unknown class comprises performing an ags function to obtain an aggregate agreement score ags for the current classifications yielded by the ML models, wherein the aggregate agreement score is a real number within a range $(-1,1)$ and indicates an extent of a deviation between the classification inferences and the historical agreements between the models.

Embodiment 9. The method as recited in any of embodiments 1-8, wherein ags is compared to a domain-dependent threshold value k, and when the ags is less than k, the data piece is deemed as being of an unknown class.

Embodiment 10. The method as recited in any of embodiments 1-9, wherein none of the ML models is required to be an open set model.

Embodiment 11. A method for performing any of the operations, methods, or processes, or any portion of any of these, disclosed herein.

Embodiment 12. A computer readable storage medium having stored therein instructions that are executable by one or more hardware processors to perform operations comprising the operations of any one or more of embodiments 1-11.

F. EXAMPLE COMPUTING DEVICES AND ASSOCIATED MEDIA

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 12:
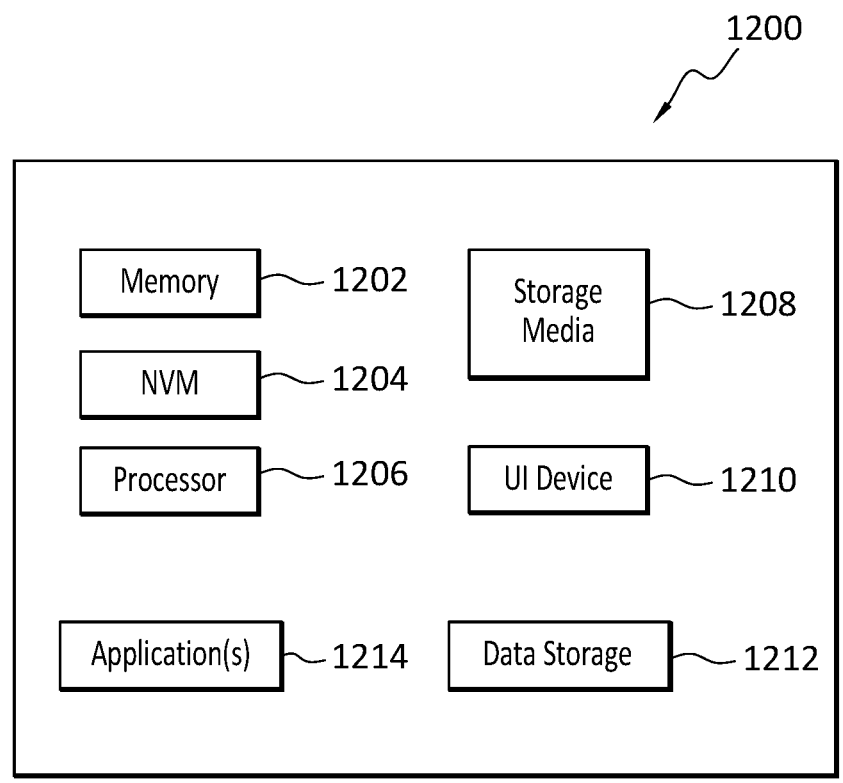
FIG. 12 discloses aspects of a computing entity operable to perform any of the disclosed methods, processes, and operations.

With reference briefly now to FIG. 12, any one or more of the entities disclosed, or implied, by FIGS. 1-11 and/or elsewhere herein, may take the form of, or include, or be implemented on, or hosted by, a physical computing device, one example of which is denoted at 1200. As well, where any of the aforementioned elements comprise or consist of a virtual machine (VM), that VM may constitute a virtualization of any combination of the physical components disclosed in FIG. 12.

In the example of FIG. 12, the physical computing device 1200 includes a memory 1202 which may include one, some, or all, of random access memory (RAM), non-volatile memory (NVM) 1204 such as NVRAM for example, read-only memory (ROM), and persistent memory, one or more hardware processors 1206, non-transitory storage media 1208, UI device 1210, and data storage 1212. One or more of the memory components 1202 of the physical computing device 1212 may take the form of solid state device (SSD) storage. As well, one or more applications 1214 may be provided that comprise instructions executable by one or more hardware processors 1206 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   identifying active device data streams obtained from multiple sensors;
   based on the active device data streams identified, selecting machine learning (ML) models, which are applicable to the active device data streams obtained from the multiple sensors and form a model agreement network;
   obtaining a respective classification inference from each of the ML models, wherein each of the classification inferences applies to a respective active device data stream;
   identifying a current agreement between the respective classification inferences generated by the ML models, wherein the current agreement is in a symmetric matrix, which is symmetric around diagonal entries of the symmetric matrix and of which each entry represents a pairwise current agreement or disagreement between a respective pair of the ML models and is a positive constant when there is a pairwise current agreement and a negative constant when there is a pairwise current disagreement;

comparing pairwise current agreements or disagreements associated with the current agreement with historical pairwise agreements or disagreements associated with historical agreements to generate an aggregate agreement score for each model;

based on the aggregate agreement score, determining whether or not each model is identified as an object of an unknown class; and removing one or more models, which have been identified as an unknown class, from the model agreement network and generating a modified model agreement network, which is a subgraph of the model agreement network.

2. The method as recited in claim 1, wherein the method is performed in real time as the active device data streams are received by the ML models.

3. The method as recited in claim 1, wherein a respective sensor generates each of the active device data streams.

4. The method as recited in claim 1, wherein identifying the current agreement is performed, for each pair of the ML models, using Boolean current agreement values for the pairwise current agreements or disagreements assigned by the ML models.

5. The method as recited in claim 1, further comprising:
building the model agreement network of model agreements; and
updating the model agreement network based on generation of classification inferences.

6. The method as recited in claim 5, wherein the building of the model agreement network is performed, prior to the comparing, as a preprocessing step, from an available database of historical pairwise agreements or disagreements.

7. The method as recited in claim 5, wherein comparing the classification inferences comprises selecting, from the model agreement network, the subgraph that represents historical pairwise agreements or disagreements among the applicable ML models.

8. The method as recited in claim 1, wherein determining whether or not each model is identified as the object of the unknown class comprises performing an ags function to obtain the aggregate agreement score for the current classifications yielded by the ML models, and
wherein the aggregate agreement score is a real number within a range (−1,1) and indicates an extent of a deviation between the pairwise current agreements or disagreements and the historical pairwise agreements or disagreements between the ML models.

9. The method as recited in claim 8, wherein the aggregate agreement score is compared to a domain-dependent threshold value, and when the aggregate agreement score is less than the domain-dependent threshold value, the one or more models are identified as the object of the unknown class.

10. The method as recited in claim 1, wherein none of the ML models is an open set model.

11. A computer readable storage medium having stored therein instructions that are executable by one or more hardware processors to perform operations comprising:
identifying active device data streams obtained from multiple sensors;
based on the active device data streams identified, selecting machine learning (ML) models, which are applicable to the active device data streams obtained from multiple sensors and form a model agreement network;
obtaining a respective classification inference from each of the ML models, wherein each of the classification inferences applies to a respective active device data stream;
identifying a current agreement between the respective classification inferences generated by the ML models, wherein the current agreement is in a symmetric matrix, which is symmetric around diagonal entries of the symmetric matrix and of which each entry represents a pairwise current agreement or disagreement between a respective pair of the ML models, and is a positive constant when there is a pairwise current agreement and a negative constant when there is a pairwise current disagreement;
comparing pairwise current agreements or disagreements associated with the current agreement with historical pairwise agreements or disagreements associated with historical agreements to generate an aggregate agreement score for each model;
based on the aggregate agreement score, determining whether or not each model is identified as an object of an unknown class; and
removing one or more models, which have been identified as an unknown class, from the model agreement network and generating a modified model agreement network, which is a subgraph of the model agreement network.

12. The computer readable storage medium as recited in claim 11, wherein the operations are performed in real time as the active device data streams are received by the ML models.

13. The computer readable storage medium as recited in claim 11, wherein a respective sensor generates each of the active device data streams.

14. The computer readable storage medium as recited in claim 11, wherein identifying the current agreement is performed, for each pair of the ML models, using Boolean current agreement values for the pairwise current agreements or disagreements assigned by the ML models.

15. The computer readable storage medium as recited in claim 11, further comprising:
building the model agreement network of model agreements; and
updating the model agreement network based on generation of classification inferences.

16. The computer readable storage medium as recited in claim 15, wherein the building of the model agreement network is performed, prior to the comparing, as a preprocessing step, from an available database of historical pairwise agreements or disagreements.

17. The computer readable storage medium as recited in claim 15, wherein comparing the classification inferences comprises selecting, from the model agreement network, the subgraph that represents historical pairwise agreements or disagreements among the applicable ML models.

18. The computer readable storage medium as recited in claim 11, wherein determining whether or not each model is identified as the object of the unknown class comprises performing an ags function to obtain the aggregate agreement score for the current classifications yielded by the ML models, and
wherein the aggregate agreement score is a real number within a range (−1,1) and indicates an extent of a deviation between the pairwise current agreements or disagreements and the historical pairwise agreements or disagreements between the ML models.

19. The computer readable storage medium as recited in claim 18, wherein the aggregate agreement score is compared to a domain-dependent threshold value, and when the aggregate agreement score is less than the domain-dependent threshold value, each model is identified as the object of the unknown class.

20. The computer readable storage medium as recited in claim 11, wherein none of the ML models is an open set model.

* * * * *